(12) United States Patent
Vance et al.

(10) Patent No.: US 7,469,776 B2
(45) Date of Patent: Dec. 30, 2008

(54) ROTATION DAMPER WITH VALVE

(75) Inventors: James Francis Vance, Culpeper, VA (US); James Brian Pipp, Covington, KY (US)

(73) Assignee: Koni B.V. (NL)

( * ) Notice: Subject to any disclaimer, the term of this patent is extended or adjusted under 35 U.S.C. 154(b) by 721 days.

(21) Appl. No.: 10/362,274

(22) PCT Filed: Aug. 22, 2001

(86) PCT No.: PCT/NL01/00616

§ 371 (c)(1),
(2), (4) Date: Jul. 16, 2003

(87) PCT Pub. No.: WO02/16183

PCT Pub. Date: Feb. 28, 2002

(65) Prior Publication Data

US 2004/0011613 A1     Jan. 22, 2004

(30) Foreign Application Priority Data

Aug. 22, 2000    (NL) ................................ 1015989

(51) Int. Cl.
*F16F 9/34* (2006.01)
(52) U.S. Cl. ................ 188/322.13; 188/322.19; 188/322.2

(58) Field of Classification Search ............. 188/275, 188/280, 282.1, 282.4, 282.5, 282.8, 283, 188/285, 286, 319.1, 319.2, 322.19, 322.2, 188/151 R, 181 R, 322.13, 288

See application file for complete search history.

(56) References Cited

U.S. PATENT DOCUMENTS 3,127,958 A * 4/1964 Szostak ................... 188/275
5,251,927 A * 10/1993 Charles et al. .......... 188/319.1
5,462,140 A * 10/1995 Cazort et al. ............. 188/275
6,334,516 B1 * 1/2002 Shirley et al. ............ 188/275

FOREIGN PATENT DOCUMENTS

GB      2159234 A   * 11/1985

* cited by examiner

*Primary Examiner*—Pam Rodriguez
(74) *Attorney, Agent, or Firm*—Bachman & LaPointe, P.C.

(57) ABSTRACT

A rotation damper for a vehicle that runs on rails, having piston and cylinder parts moving with respect to one another. This damper has a friction characteristics, that is to say the fluid connection over the piston is not a permanently open hole but exclusively comprises spring-loaded valves. In order to facilitate the installation of such dampers, it is proposed to make a separate connection between the working cylinder and the reservoir in which a valve that can be manually operated is arranged, which valve, on operation, opens a connection as a result of which the piston and cylinder can be moved relative to one another under manual force.

5 Claims, 2 Drawing Sheets

ROTATION DAMPER WITH VALVE

BACKGROUND OF THE INVENTION

The present invention relates to a damper comprising a piston and cylinder section, each provided with fixing means for fixing to the parts moving with respect to one another, a cylinder part within which said piston moves being delimited in said cylinder and a chamber being delimited on either side of the piston, which chambers are connected to one another via a damping element, as well as a further chamber to which said displaced fluid can be transferred, said damper being constructed such that relatively high force is needed for displacement at low speed.

A damper of this type is generally known in the prior art and is used, for example, as rotation dampers in, for example, vehicles that run on rails. However, it is emphasised that the invention is not restricted to such rotation dampers. The invention in general relates to dampers having a so-called frictional force characteristic. That is to say, a high force is needed even at low speeds of displacement of the piston and cylinder with respect to one another. This is, for example, achieved in the prior art in that all fluid connections that make movement of the piston in the cylinder possible are provided with spring-loaded valves. That is to say, a certain fluid pressure must always be built up in order to overcome the resilience of the spring-loaded valves concerned. However, other dampers where displacement at low speed requires high force also fall under the invention.

As already indicated, such dampers are used, for example, as rotation dampers in vehicles that run on rails. In this context, the rotary movement of the bogies of such vehicles relative to the other part of the vehicle is damped as much as possible. As a result, it is possible to travel at higher speeds.

Because of the particular characteristics of such dampers, the fitting thereof is made appreciably more difficult. By way of example, a typical force for moving a piston and cylinder relative to one another is greater than 500 N. In the prior the art hydraulic aids are known by means of which the damper and thus, in particular, the fixings thereof accurately acquire the same spacing as the fixing supports on the vehicle that runs on rails. Sometimes it is also possible, when first fitting, to match fixing points on the vehicle that runs on rails to the distance between the fixings for the damper. However, if fitting is carried out at a later date, that is to say during a major or minor service, such possibilities do not exist and it is necessary to use special tools.

In the prior art, attempts have also been made to construct the supports by means of which such dampers are mounted on the vehicle that runs on rails such that they are adjustable in some way or other. However, appreciable costs are associated with this, whilst the construction has to be made much heavier.

The dampers described above must be distinguished from dampers for damping the movement of a vehicle wheel, such as, for example, are described in GB 2 159 234 A. In the unfitted state, the two parts of the dampers can be moved by hand. This British patent shows an additional channel for connecting the chambers located on either side of the piston. The valve contained therein can be operated electrically, as a result of which the damping characteristics can be changed while the vehicle is travelling.

A hydraulic, height-adjustable device is described in U.S. Pat. No. 5,362,034. With this device the piston does not delimit two chambers that communicate with one another via a damping element. Depending on the quantity of fluid that is present above the piston, the seat height of a seat can be adjusted. This quantity of fluid can be controlled with the aid of a hand-operated valve.

The object of the present invention is to improve the rotation damper described above such that simple fitting is possible, that is to say the distance between the fixings on the damper can be adjusted in a simple manner to the distance between the fixings on the vehicle concerned on which the damper has to be mounted.

SUMMARY OF THE INVENTION

The object is achieved with a damper as described above in that a connection provided with a hand-operated valve is provided between said cylinder part and said further chamber.

According to the present invention there is a connection between the cylinder part and the reservoir and a valve is arranged in said connection. Preferably, this valve is so constructed that it makes the connection only when actively operated. This connection can, for example, be constructed as a pull valve. By manually pulling on such a valve the connection is made and movement of the piston and cylinder relative to one another is possible with relatively low force. Low force is understood in particular to be a force of less than 500 N, that is to say a force that is relatively easy for a single person to apply. This means that no further aids or additional staff are needed to fit dampers of this type.

The valve can be any valve known in the state of the art. As already indicated, this is preferably a spring-loaded pull valve.

Of course, the rotation damper for a vehicle that runs on rails that has been described above can be provided with a further electrical valve that controls damping, for example depending on the speed of travel.

BRIEF DESCRIPTION OF THE DRAWINGS

The invention will be explained in more detail below with reference to an illustrative embodiment shown in the drawing. In the drawing.

DETAILED DESCRIPTION

Figure 1:
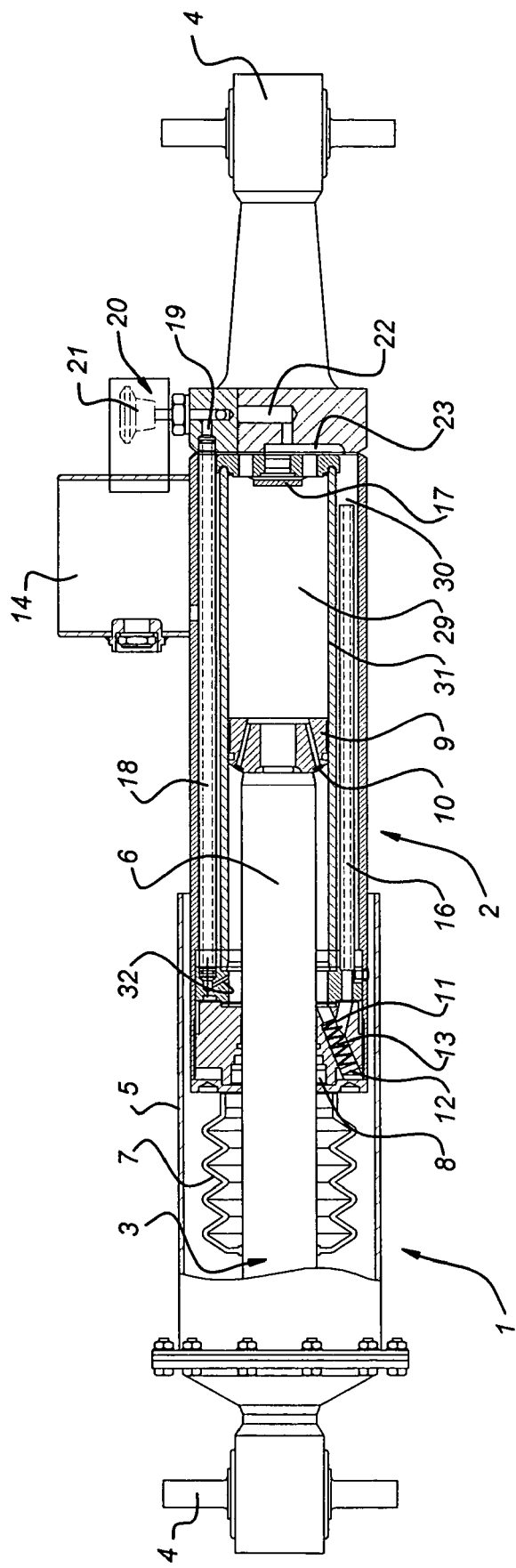
FIG. 1 shows, diagrammatically in cross-section, a damper according to the invention.
Figure 2:
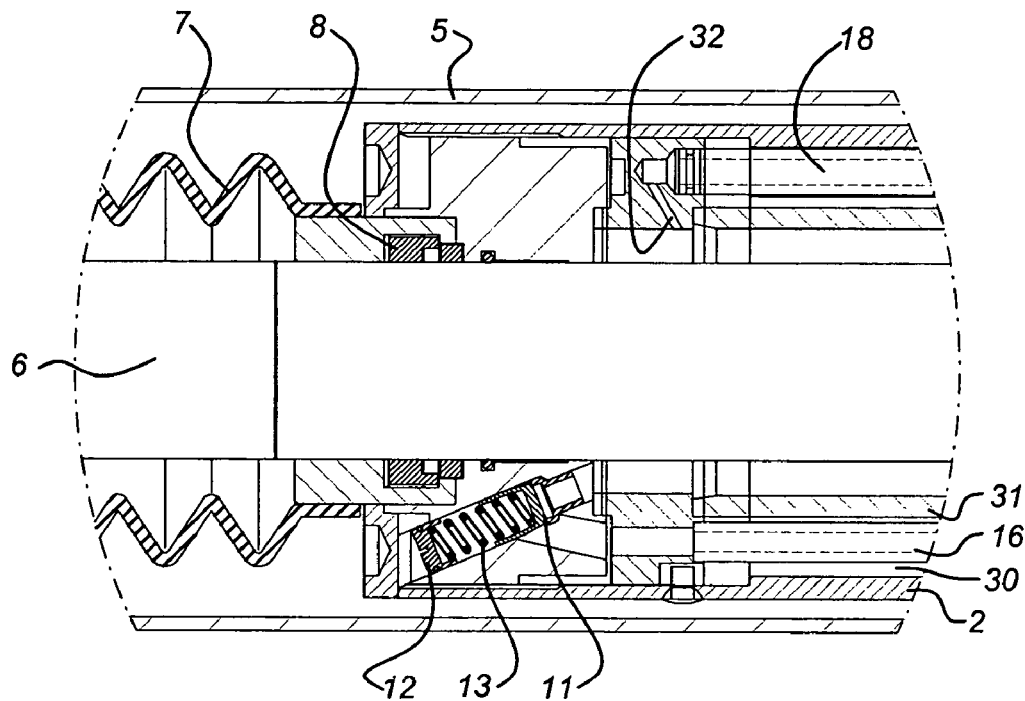
FIG. 2 shows a detail of the damper according to FIG. 1.

In FIG. 1 a damper according to the invention is indicated by 1. A so-called rotation damper is shown in the illustrative example shown. This damper consists of a cylinder 2 and a piston assembly 3. Each of these components is provided with a fixing eye 4 for fixing, in a manner not shown in more detail, to, on the one hand, a bogie of a vehicle that runs on rails and, on the other hand, the chassis or other part thereof.

The piston comprises a piston rod 6 and this is shielded from the environment with on the one hand, a dust cover 5 and, on the other hand, a bellows seal 7. Sealing of the piston rod with respect to the cylinder is effected with a skimming/sealing ring 8.

Piston rod 6 is provided with a piston 9. This can be sealed in some way or other with respect to the cylinder wall 31. Bearing between the piston 9 and cylinder wall 31 can comprise, for example, a plastic sleeve.

A number of holes provided with a spring-loaded valve 10 are provided in the piston.

Piston 9 moves back and forth in cylinder 2 and delimits a cylinder part 29. This cylinder part is at one end provided with a spring-loaded bottom valve 17 and at the other end provided with a number of spring-loaded valves 11. The springs of these spring-loaded valves 11 are indicated by 13 and the tension thereon can be adjusted by means of adjuster screw 12. Connecting lines 16 are present which connect the outlet of the spring-loaded valves 11 with chamber 30. A buffer chamber 14 is present to provide compensation for the fluid volume in the cylinder part 29. The liquid level in this buffer chamber 14 can be discerned through sight glass 15, if fitted.

This part of the construction is generally known in the state of the art. Movement of piston 9 within cylinder part 29 is possible only if one or more of the spring-loaded valves 10, 11, 17 are opened. That is to say there is no permanent connection over the piston with a hole of small cross-section.

With a damper of this type it is possible to obtain a particularly flat damping characteristic, that is to say the damping force is essentially independent of the speed of movement of the piston with respect to the cylinder. Such a damper can have an appreciable stroke but is effective even at low speed.

A disadvantage associated with such a construction is that when such a damper is put to use the distance between the fixing eyes 4 has to agree accurately with the distance between the fixings on the vehicle that runs on rails. After all, for this purpose the full damping force has to be overcome and this is in general higher for vehicles that run on rails than can be generated by the mechanic concerned himself. A value of 500 N may be mentioned by way of example. In order to solve this problem it is proposed according to the invention to provide a connection via bypass line 18. With this arrangement there is a permanently open hole 32 in the top of the cylinder, which hole is in communication with bypass line 18, which is connected via valve 20 and line 22 to chamber 23 in the bottom of the damper.

Figure 3:
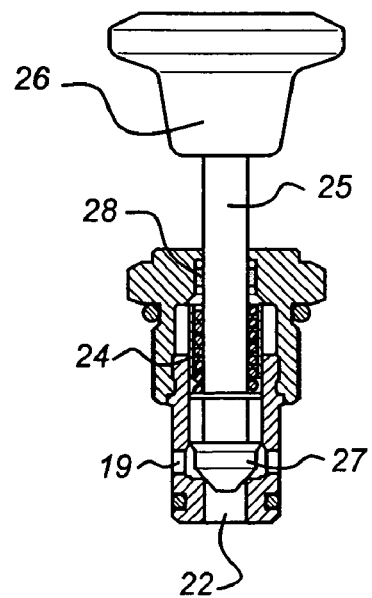
FIG. 3 shows in detail the valve shown in FIG. 1 in cross-section.

The valve 20 is a spring-loaded, manually operated valve and details of this can be seen in FIG. 3. 25 indicates a puller pin connected to a pull knob 26 that can be moved outwards against the force of spring 24. By this means a valve body 27 is moved such that inlet 19 is in communication with outlet 22. 28 indicates a seal that prevents fluid from leaking outwards.

During normal operation, valve 20 is closed. The spring 24 and the particular characteristics thereof ensure that there is no unintentional opening of the valve even under peak loads, such as occur with dampers according to the invention. The pull knob 27 is, moreover, protected by a bracket 21 (FIG. 1) against unintentional operation from the outside.

However, valve 20 is operated during the fitting step. Communication between inlet 19 and outlet 22, that is to say connection between hole 32 and chamber 23, is made by pulling on knob 26. As a result of the negligible throttling in the hole 32 and line 22, the piston part can be moved relative to the cylinder part with relatively little force when the valve 20 is open. The spring-loaded valves 11, which are effective during operation, do not operate during this movement, that is to say they are continually closed. The force generated by the springs 13 is so high that the spring-loaded valves 11 cannot be opened by manual force.

Although the invention has been described above with reference to a preferred embodiment, it will be understood that numerous modifications can be made thereto. The damper can be used for purposes other than as a rotation damper for vehicles that run on rails. Any damper which has an initial threshold for moving the various parts apart can, in principle, be provided with the construction according to the invention. Furthermore, the valve can be fitted in any desired location and placed either in the line 18 described above or in any other connection (chamber). All such modifications are considered to fall within the scope of the appended claims and are obvious to those skilled in the art.

The invention claimed is:

1. A damper comprising:
   a cylinder;
   a piston mounted in the cylinder and dividing the cylinder into a first cylinder chamber and a second cylinder chamber;
   first fluid connection means for connecting the first cylinder chamber to a further chamber, the first fluid connection means includes pressure operated valve means for connecting the first cylinder chamber to the further chamber during normal operation of the damper; and
   second fluid connection means for connecting the first cylinder chamber to the further chamber, the second fluid connection means includes a manually operated valve which is closed during normal damping operation of the damper and manually opened during fitting of the damper, wherein the piston and cylinder can be moved with respect to one another using a force of less than 500 N when the hand-operated valve is open.

2. A damper according to claim 1, wherein the piston and cylinder are loaded such that a minimum force of 500 N is required in order to move the piston and the cylinder relative to one another when the hand operated valve is closed.

3. A damper according to claim 1, wherein said hand-operated valve comprises a spring-loaded pull valve.

4. A damper according to claim 1, wherein the hand-operated valve includes a valve body having an effective surface area for fluid on either side of the valve body which is substantially identical.

5. A damper according to claim 1, wherein the damper is fixed to a vehicle that runs on rails.

* * * * *